United States Patent
Kim et al.

(10) Patent No.: US 12,134,188 B2
(45) Date of Patent: Nov. 5, 2024

(54) MODULE AND METHOD FOR LINKING DRIVING UNITS OF ROBOT SYSTEM

(71) Applicant: ROBOTIS CO., LTD., Seoul (KR)

(72) Inventors: Hong Hyun Kim, Anyang-si (KR); Soo Kyung Son, Gimpo-si (KR); Dae Sung Choi, Bucheon-si (KR); Jin Wook On, Gimpo-si (KR); Byoung Soo Kim, Seoul (KR); In Yong Ha, Seoul (KR)

(73) Assignee: ROBOTIS CO., LTD., Seoul (KR)

( * ) Notice: Subject to any disclaimer, the term of this patent is extended or adjusted under 35 U.S.C. 154(b) by 279 days.

(21) Appl. No.: 17/736,471

(22) Filed: May 4, 2022

(65) Prior Publication Data

US 2022/0258331 A1    Aug. 18, 2022

Related U.S. Application Data

(63) Continuation of application No. PCT/KR2019/014917, filed on Nov. 5, 2019.

(30) Foreign Application Priority Data

Nov. 4, 2019    (KR) ........................ 10-2019-0139589

(51) Int. Cl.
- *B25J 9/08* (2006.01)
- *B25J 9/16* (2006.01)
- *G05B 19/41* (2006.01)
- *G05B 19/4155* (2006.01)

(52) U.S. Cl.
CPC .............. *B25J 9/08* (2013.01); *B25J 9/1602* (2013.01); *G05B 19/4155* (2013.01); *G05B 2219/50391* (2013.01)

(58) Field of Classification Search
CPC .......... B25J 9/08; B25J 9/1602; B25J 9/1628; G05B 19/4155; G05B 2219/50391; G05B 2219/40304; G05B 2219/40411
See application file for complete search history.

(56) References Cited

U.S. PATENT DOCUMENTS

2019/0121335 A1*  4/2019  Yoneda .............. G05B 19/0405
2019/0337159 A1*  11/2019  Tokuda .................. H02K 7/003

FOREIGN PATENT DOCUMENTS

| JP | 06046004 A | * | 2/1994 |
| JP | 2004001195 A | | 1/2004 |
| JP | 2017135961 A | | 8/2017 |
| KR | 1020080057802 A | | 6/2008 |

(Continued)

OTHER PUBLICATIONS

Translation JP-06046004-A (Year: 1994).*
International Search Report of PCT/KR2019/014917 dated Jul. 28, 2020.

*Primary Examiner* — Rachid Bendidi
(74) *Attorney, Agent, or Firm* — Dinsmore & Shohl LLP; Yongsok Choi, Esq.

(57) ABSTRACT

A module and method for linking information of a plurality of driving units, and a module and method for linking driving units of a robot system in which a master controls a plurality of driving units included in a plurality of slave devices through communication are provided. The module and method for linking driving units of a robot system provide compatibility with an existing robot motion table that uses one driving unit for one device without requiring a separate conversion operation.

6 Claims, 7 Drawing Sheets

(56) References Cited

FOREIGN PATENT DOCUMENTS

| | | |
|---|---|---|
| KR | 1020090049651 A | 5/2009 |
| KR | 1020130049022 A | 5/2013 |
| KR | 101704638 B1 | 2/2017 |

* cited by examiner

FIG. 7A

| Frame | ID1 | ID2 | ID3 | ID4 ||  |
|---|---|---|---|---|---|---|
| | | | | Driving Unit 1 | Driving Unit 2 | ... |
| 1 | 0° | 10° | 40° | -10° | 30° | |
| 2 | 0° | 20° | 40° | 0° | 20° | |
| 3 | 0° | 30° | 40° | 10° | 10° | |

FIG. 7B

| Frame | ID1 | ID2 | ID3 | ID4 | ID5 | ... |
|---|---|---|---|---|---|---|
| 1 | 0° | 10° | 40° | -10° | 30° | |
| 2 | 0° | 20° | 40° | 0° | 20° | |
| 3 | 0° | 30° | 40° | 10° | 10° | |

MODULE AND METHOD FOR LINKING DRIVING UNITS OF ROBOT SYSTEM

CROSS-REFERENCE TO RELATED APPLICATIONS

This application is a continuation of International Application No. PCT/KR2019/014917 filed on Nov. 5, 2019, which claims priority to Korean Patent Application No. 10-2019-0139589 filed on Nov. 4, 2019, the entire contents of which are herein incorporated by reference.

TECHNICAL FIELD

The present disclosure relates to a module and method for linking driving units, and more particularly, to a module and method for linking driving units of a robot system in which a master controls a plurality of driving units included in a plurality of slave devices through communication in the robot system.

BACKGROUND ART

In robotic technology which is rapidly developing in recent years, control of an actuator related to an operation of a robot, or more precisely, control of a drive motor is very important. One robot is equipped with several to tens of actuators, and each actuator includes one or more drive motors. Robotics requires that each drive motor be precisely controlled while the entire actuators are controlled in an interactive and organic way at the same time. In the related art where one drive motor is connected to one actuator (device), it is possible to control the drive motor with the actuator information alone. However, thanks to the development of technology, one actuator can now include a plurality of drive motors.

Meanwhile, in a system configured with devices that are controlled through communication, a master manages a plurality of devices as slaves. Each slave may include one or more driving units. As a method of distinguishing each slave, each slave is assigned a unique key value and used. This key value is mainly used as an identifier (ID). When there is only one driving unit in one slave or device, an ID can be assigned to the device and the driving unit of the device can be controlled using the device ID as a key value. A method of assigning one ID to one device is used. Each device has one piece of device information that is configured of driving unit setting values including IDs and various status information, and the control unit uses this information to control the device. For example, one drive motor (driving unit) is connected to one actuator (device), so that it is possible to control the drive motor with the actuator information alone. However, with the development of technology, there is an increasing trend of adding a plurality of driving units to one device, such as having a plurality of drive motors in one actuator. In this case, it is necessary to separately assign the driving unit IDs under the device ID so that the setting values and various state information of several driving units are included in the one piece of device information.

Conventionally, the robotic technology employs a method of displaying information based on the slave device ID, and accordingly, in order to obtain information of the desired driving unit in one device information, the user has to access the desired device with the device ID, and continue to find the item of the desired driving unit with the sub-driving unit ID, which is a hassle for the user. Moreover, as the number of driving units connected to one slave device increases, the management can be more complex. In addition, when a device including a plurality of driving units and a device including a single driving unit are used together, the master has to manage the number of driving units of each device and apply different methods when accessing the device information of the driving units. This increases the complexity of implementing software for master, and maintenance is also not easy.

The background art of the present disclosure is disclosed in Korean Patent Laid-open No. 10-2008-0057802.

SUMMARY

Technical Problem

The present disclosure provides a module and method for linking driving units of a robot system, which are capable of individually managing and controlling information of each driving unit, when a plurality of slaves that a master controls using communication have a plurality of driving units.

The present disclosure provides a module and method for linking driving units of a robot system, which are capable of using an existing device having a single driving unit and also a device having a plurality of driving units together, without requiring any special conversion process.

Technical Solution

According to one aspect of the present disclosure, there is provided a module for linking driving units of a robot system including.

According to an embodiment of the present disclosure, a module for linking driving units of a robot system is provided, in which a module for linking driving units of a device including a plurality of driving units using communication may include a communication unit that provides communication between a master and a plurality of slave devices, a control unit that controls driving units connected to the slave devices in response to a request of the master, a device information unit that individually manages a plurality of driving unit control tables including a driving unit identifier, and driving units controlled according to the driving unit control table information.

According to another aspect of the present disclosure, there are provided a method for linking driving units of a robot system, and a computer-readable recording medium recording a computer program for executing the method.

The method and the recording medium according to an embodiment of the present disclosure may include, in the module for linking driving units of a robot system, receiving a request to change information of a driving unit from a master, reflecting the information of the driving unit in a control table of the driving unit, and accessing, by the driving unit, the control table of a corresponding driving unit by using a driving unit identifier stored in mate identifier information to change the information.

Effects of Invention

According to an embodiment of the present disclosure, a module and method for linking driving units of a robot system can effectively link information—shared information to be specific—in control tables of a plurality of driving units included in one device.

According to an embodiment of the present disclosure, the module and the method for linking driving units of a robot system can more precisely and efficiently control a plurality of driving units included in one device.

According to an embodiment of the present disclosure, the module and the method for linking driving units of a robot system provide compatibility such that, even when a device with a plurality of driving units is newly added or replaced for an existing device with a single driving unit, it is possible to use a robot motion table that uses the existing device having the single driving unit without requiring a separate conversion operation.

BRIEF DESCRIPTION OF THE DRAWINGS

FIGS. 7A and 7B are diagrams for explaining a compatibility of a robot motion table according to an embodiment of the present disclosure.

DETAILED DESCRIPTION

Figure 1:
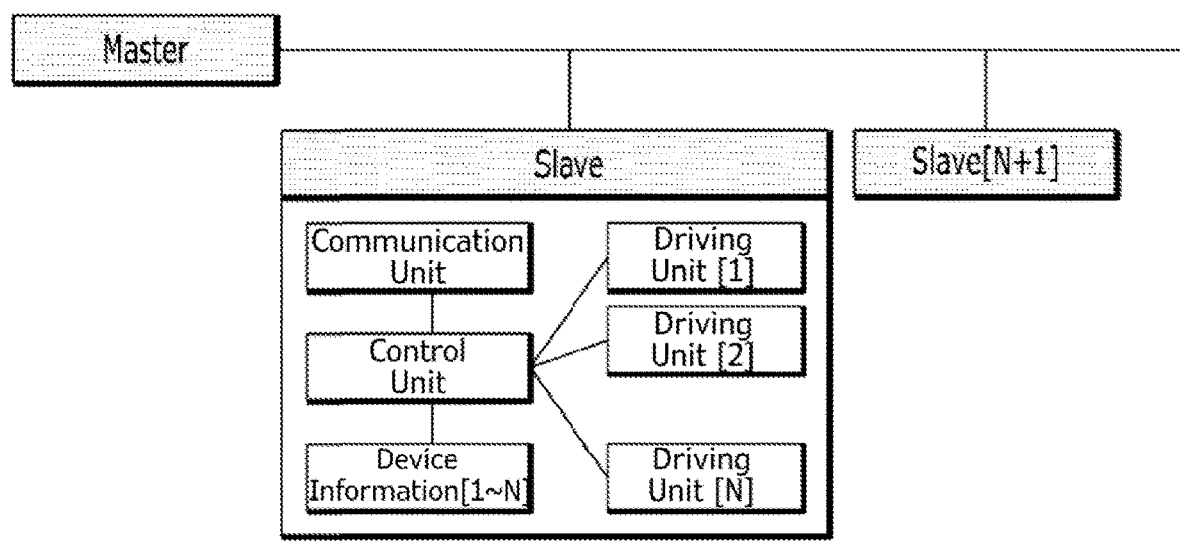
FIGS. 1, 2, 3, 4, and 5 are diagrams for explaining a module for linking driving units of a robot system according to an embodiment of the present disclosure.

Since the present disclosure can have various modifications and various embodiments, certain embodiments are illustrated in the drawings by way of examples and will be described in detail through detailed description. However, it should be understood that the disclosure is not to be limited to specific embodiments, but includes all modifications, equivalents, and alternatives falling within the spirit and scope of the disclosure. In describing the present disclosure, when it is determined that a detailed description of a related known technology may unnecessarily obscure the gist of the present disclosure, the detailed description thereof will be omitted. In addition, a singular expression used in the description and the claims should generally be construed to mean "one or more" unless stated otherwise.

Hereinafter, preferred embodiments of the present disclosure will be described in detail with reference to the accompanying drawings, and in the description with reference to the accompanying drawings, the same or corresponding components are given the same reference numerals, and redundant descriptions thereof will be omitted.

FIGS. 1 to 5 are diagrams for explaining a module for linking driving units of a robot system according to an embodiment of the present disclosure.

Referring to FIG. 1, a module 10 for linking driving units of a robot system may be applied in an environment in which a master controls a slave device through communication in the robot system.

The module 10 for linking driving units of a robot system controls a plurality of slave devices through a master, and the slave devices may include one or more driving units 400. In order to manage a plurality of driving units 400 connected to one slave device, the module 10 for linking driving units of a robot system generates and manages device information of each driving unit separately by the number of driving units (1 to N). However, the traditional way of managing with the slave device identifier (device ID) alone can not individually manage the device information of a plurality of driving units. Since the plurality of driving units 400 included in one slave device share a communication unit 100 and a control unit 200, it is not easy to individually control the driving units 400. In order to manage the driving unit device information individually, the module 10 for linking driving units of a robot system assigns an identifier (ID) to each driving unit 400 rather than the slave device.

Figure 2:
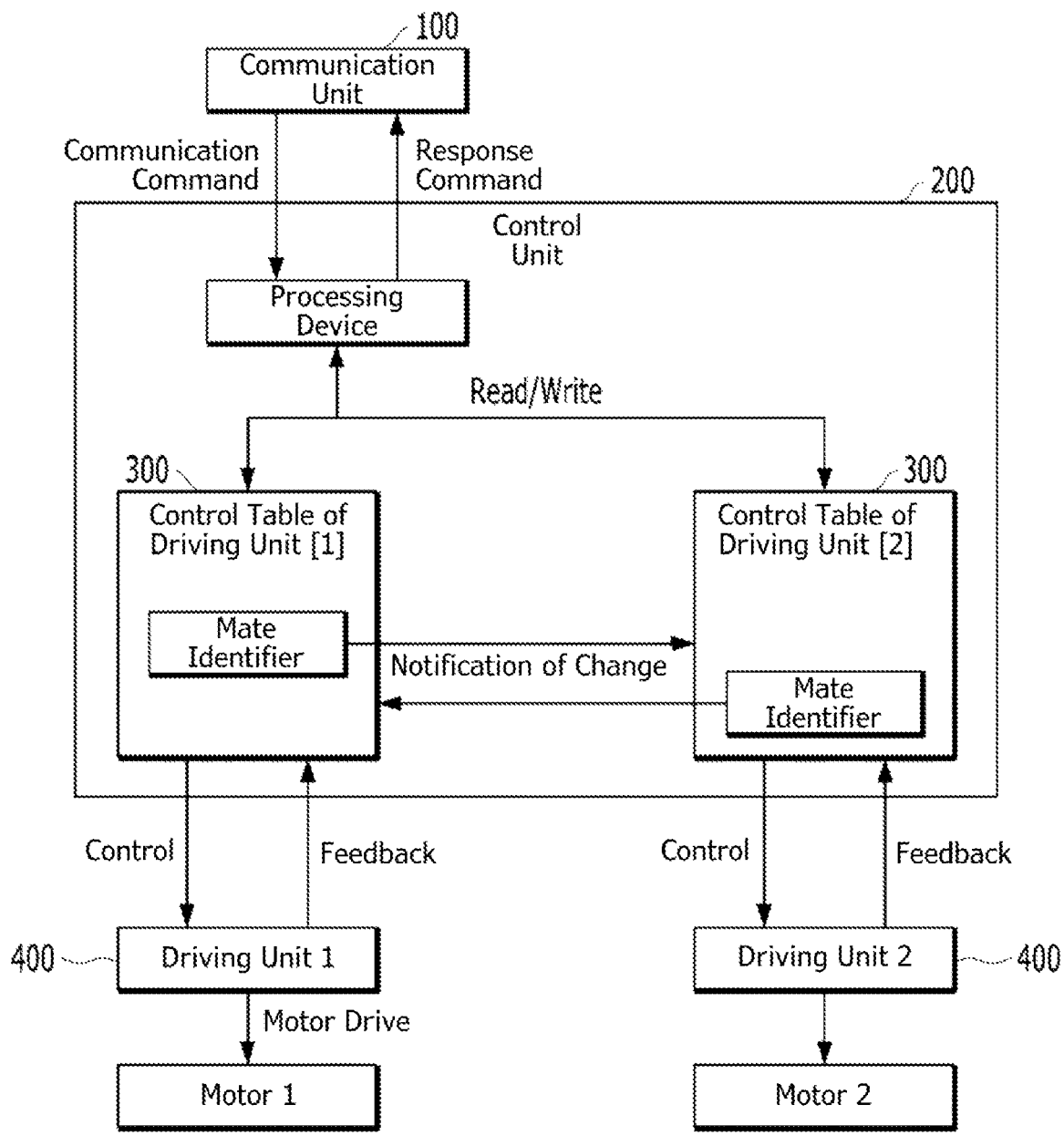

Referring to FIG. 2, the module 10 for linking driving units of a robot system includes the communication unit 100, the control unit 200, device storage units 300, and the driving units 400.

The communication unit 100 enables communication between the master and a plurality of slave devices.

In response to a request of the master, the control unit 200 controls the driving units 400 connected to the slave device by using the information stored in the device storage unit 300.

The device storage unit 300 stores and manages device information, setting information, control information, and management information of the driving unit. The information storage unit 300 includes not only a driving unit identifier 310 and driving unit device information 320, but also all information for controlling the driving unit 400, such as communication unit device information 330, control unit device information 340, and the like. Since the device storage unit 300 individually manages a control table including the driving unit identifiers 310 of a plurality of driving units for each driving unit 400, it is possible to individually control the driving units 400.

The communication unit device information 330 and the control unit device information 340 may be information on states and settings of the communication unit 100 and the control unit 200. The information storage unit 300 may further include a mate identifier (Mate ID) 350. The mate identifier 350 refers to the identifiers 310 of a plurality of other driving units (excluding oneself) connected to one slave device. The communication unit device information 330 and the control unit device information 340 are shared by the plurality of driving units 400 connected to one slave device, and the mate identifier 350 links part of these information that should have the same value.

Movements of the driving units 400 are controlled by the control unit 200 using the information stored in the device storage unit 300. The plurality of driving units 400 can be individually managed through the control unit 200 because the device storage unit 300 manages the information respectively.

To describe FIG. 2 in detail, the communication unit 100 receives a request from the master to control the plurality of driving units 400 connected to one slave and transmits the request to the control unit 200.

The control unit 200 controls a desired driving unit 400 to operate the motor according to the driving unit device information (control table) of that driving unit stored in the device information unit 300. The device information unit 300 separately manages the control tables of the driving units for each driving unit 400. For example, since the plurality of driving units 400 share the communication unit 100 of the connected slave device, all of the plurality of driving units 400 can communicate with the master only when all of them have the same designated communication speed. That is, when the shared device information is changed in one 400 of the plurality of driving units 400, it is required that the device information of the other driving units 400 be changed in link with the same. In this case, the information stored in the device information unit 300 of the other driving units is linked by using the mate identifier 350 as a key value.

The driving unit 400 is controlled based on a value stored in the control table of the driving unit 400 of the device information unit 300.

Figure 3:
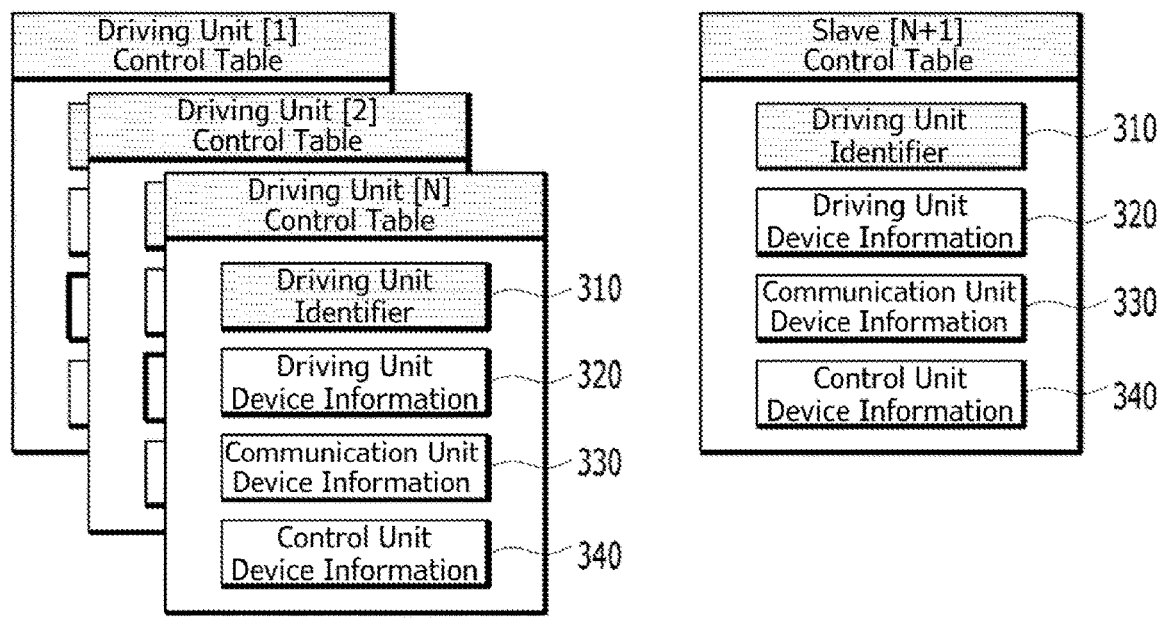

Referring to FIG. 3, the module 10 for linking driving units of a robot system assigns an identifier (ID) in units of driving units 400, rather than assigning ID in units of slave devices, and generates the control tables of the driving units 400 individually. By using the driving unit identifier 310 as a key value, the master may recognize the actual driving units 400 as separate devices, while there is one single physical slave device.

When the control table is managed with the slave device identifier, the master has to access the desired slave device with the slave device identifier and then continue to find the control table of the desired driving unit 400. However, when the driving units 400 have individual driving unit identifiers 310, the master can access the control table information of the driving units 400 using the driving unit identifiers 310 as the key value. Therefore, it is convenient as the master can recognize and control each driving unit 400 as an individual device, and separately manage the control table information for each individual driving unit 400. In addition, with the module 10 for linking driving units of a robot system, since the driving unit identifier 310 is generated as many as the number of driving units, it is possible to intuitively check how many driving units 400 are included in total. In particular, when a slave device having a plurality of driving units 400 and a slave device having a single driving unit 400 are used together, by the traditional way of managing information with the slave device identifier, it is required to change the way of accessing the control table information of the slave and the driving unit 400 depending on how many driving units 400 are connected to the slave device, but with the module 10 for linking driving units of a robot system, it is possible to directly access the control table of the desired driving unit 400 using the driving unit identifier 310 as a key value. For example, since the driving unit identifier 310 information may include slave device identification information, it is possible to integrally manage the slave device identification information and the driving unit identification information.

Figure 4:
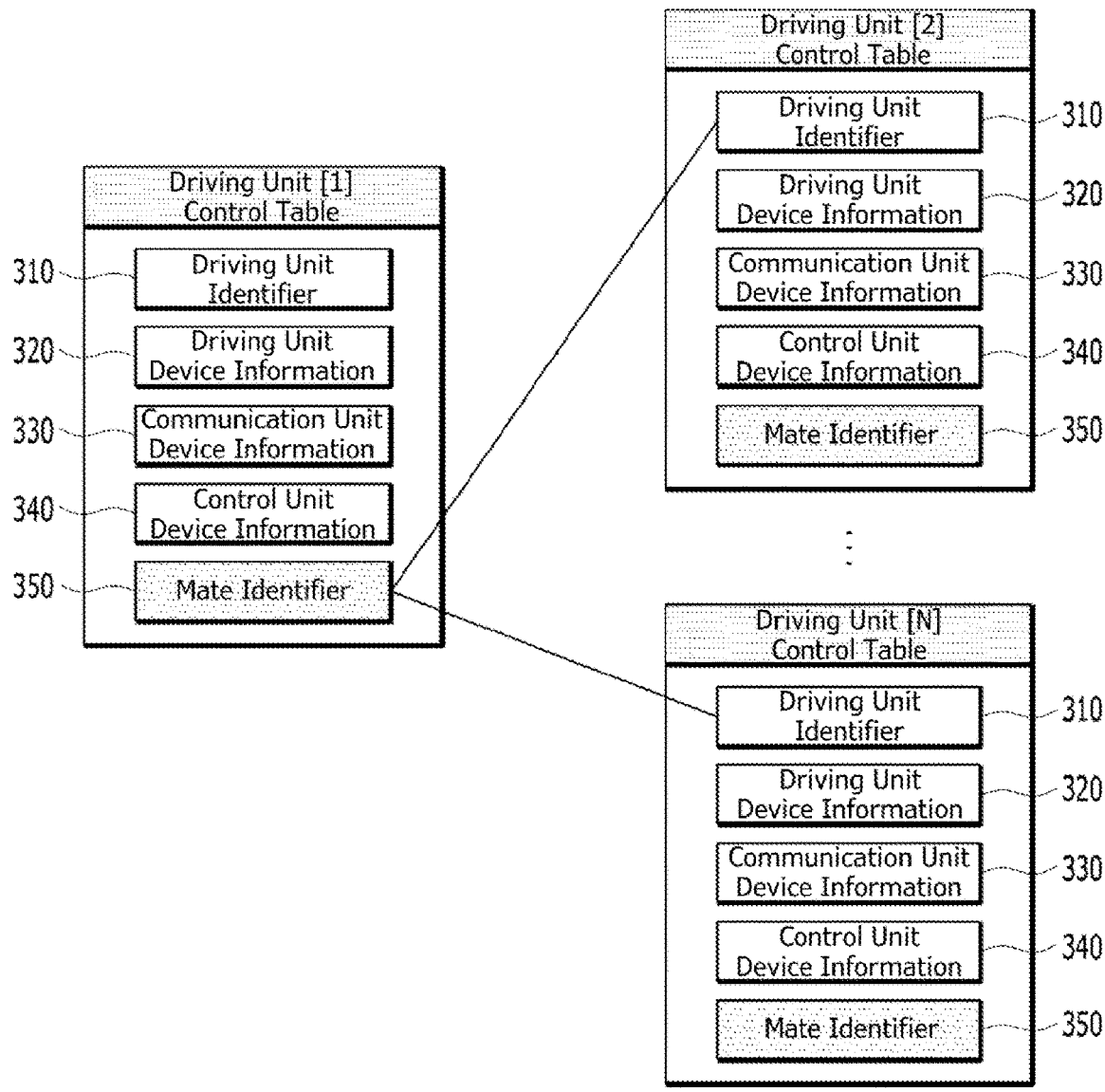

Referring to FIG. 4, although the control table information is individually managed for the plurality of driving units 400 in one slave device, it is necessary to link the information on the physically-shared units which are the communication unit 100 and the control unit 200. To this end, the control table information of each driving unit 400 includes the driving unit identifiers 310 of the plurality of driving units 400 that physically share the communication unit 100 and the control unit 200. More specifically, the module 10 for linking driving units of a robot system can access the control table information of the other driving units 400 by using all the driving unit identifiers 310 managed by the slave device as key values. The mate identifier (Mate ID) 350 information includes the driving unit identifiers 310 of the other driving units 400 included in the same slave device. For example, when the communication speed of the driving unit [1] is changed, this also affects the communication speeds of the driving units [2] to [N] that physically share the communication unit. That is, when the master changes the communication speed of the driving unit [1] and then accesses the driving unit [2], communication is not performed properly. Therefore, when the master changes the communication speed of the driving unit [1], the driving unit [1] device information checks the mate identifier 350 information and uses the stored driving unit identifier 310 as a key value to access the control table information of the driving units [2] to [N] to change the communication speeds. Then, the master can normally access the driving units [2] to [N] at the changed communication speed for communication.

Figure 5:
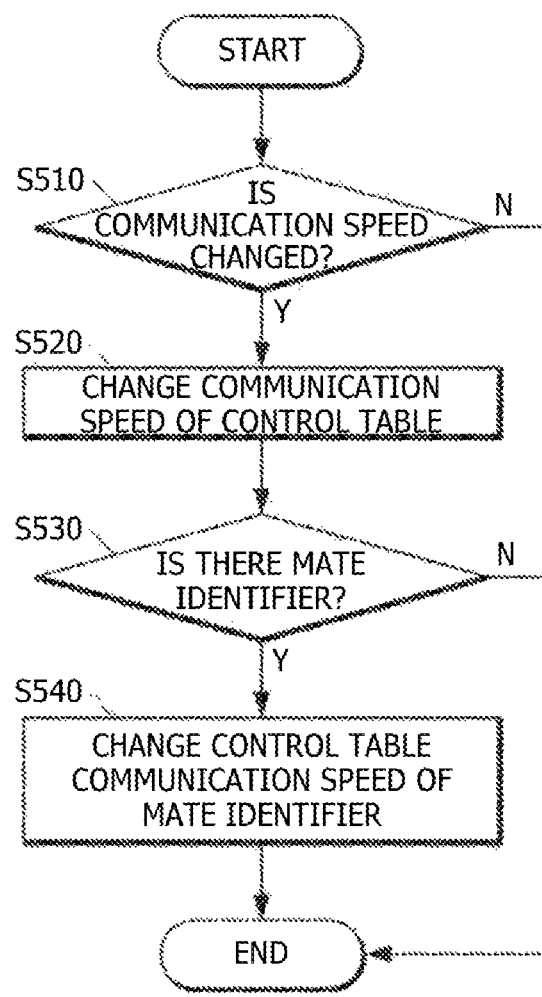

Referring to FIG. 5, it can be seen how the module 10 for linking driving units of a robot system according to an embodiment of the present disclosure uses the mate identifier to access the control table information of the driving unit 400 and change the information.

According to an embodiment of the present disclosure, at S510, the module 10 for linking driving units of a robot system checks if there is a request to change information of the driving unit from the master. For example, a request to change the communication speed of the driving unit may be received from the master.

At S520, the module 10 for linking driving units of a robot system reflects the information of the driving unit for which the request is received in the control table of the driving unit and stores the same. For example, when it is necessary to change the communication speed, the communication speed information of the control table of the corresponding driving unit 400 may be changed.

At S530, the module 10 for linking driving units of a robot system checks if there is the mate identifier 350 for the corresponding driving unit 400.

When there is the mate identifier 350, at S540, the module 10 for linking driving units of a robot system uses the driving unit identifier 310 stored in the mate identifier 350 information to access all the corresponding driving unit 400 control tables and correct the information to be changed. For example, by using the information of the driving unit identifier stored in the mate identifier as a key value, it is possible to access the control table of the corresponding driving unit to change the communication speed to the same value.

Note that, while the communication speed is described as an example of the shared information in the present disclosure, all the information shared by the slave device including a plurality of driving units can be linked using the mate identifier 350 information. For example, when write-protection is set in the control table of the driving unit 400, this is linked to the control tables of all the other driving units 400 connected to the same slave device, so that the same effect can be applied.

Figure 6:
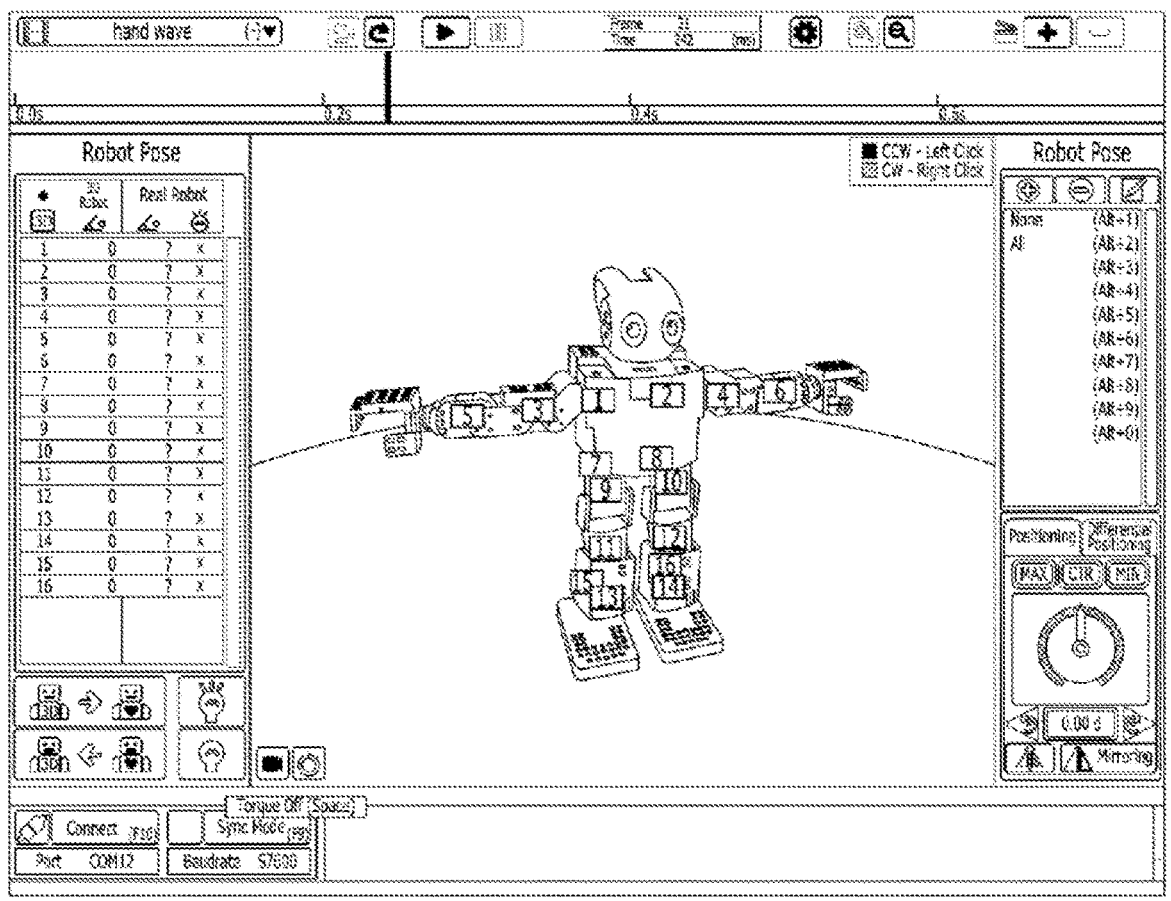
FIG. 6 illustrates an exemplary screen using the module for linking driving units of a robot system according to an embodiment of the present disclosure.

FIG. 6 illustrates an exemplary screen using the module for linking driving units of a robot system according to an embodiment of the present disclosure.

Referring to FIG. 6, compatibility with the related robot motion table is provided by using the driving unit identifier according to an embodiment of the present disclosure. A motion table is provided in a form that stores a pose of the robot for each time frame, and the poses are designated as joint angles of each driving unit.

FIG. 7 is a diagram for explaining the compatibility of the robot motion table according to an embodiment of the present disclosure.

Referring to FIG. 7, it can be seen that an identifier and an angle for each joint are matched to each other to create a robot motion table.

FIG. 7A is a diagram illustrating a motion table configured in a slave device by using an identifier, and FIG. 7B is a diagram illustrating a motion table configured using a driving unit identifier.

When a multi driving unit slave device (a slave device including a plurality of driving units) and a single driving unit slave device (a slave device including a single driving unit) are used together, if the information is managed using the related slave device identifier, as illustrated in FIG. 7A, it is necessary to change a way of accessing the motion table information according to how many driving units 400 are connected to the slave device. However, when the driving unit identifier 310 is used as illustrated in FIG. 7B, compatibility with the related motion table is always ensured without requiring a separate conversion operation even when the slave device is configured to use a plurality of driving unit slave devices only, or when the multi driving unit slave device and the single driving unit slave device are used together, or when the multi driving unit slave device are used only, or when the single driving unit slave device is replaced with or converted into the multi driving unit slave device.

In other words, FIG. 7A illustrates motion table information configured when an identifier is assigned to the slave device and when a plurality of driving units are included in one slave device, and FIG. 7B illustrates information of a motion table configured by using the driving unit identifier 310 according to an embodiment of the present disclosure. To describe this in detail, for example, when the configuration of one slave device having one driving unit is replaced with one slave device having two driving units, the related approach that uses the slave device identifier requires a separate conversion operation as in the case of the motion table (FIG. 7A). However, when the driving unit identifier 310 is used, even when the configuration of the slave device and the driving unit are changed, the existing motion table (FIG. 7B) can be used as it is.

The method for linking driving units of a robot system described above may be implemented as a computer-readable code on a computer-readable medium. The computer-readable recording medium may be a removable recording medium (CD, DVD, Blu-ray disk, USB storage device, removable hard disk) or a fixed recording medium (ROM, RAM, computer-equipped hard disk), for example. The computer program recorded on the computer-readable recording medium may be transmitted to the other computing devices through a network such as the Internet or the like and installed in the other computing devices, thereby being used in the other computing devices.

When it is described above that all components forming the embodiment of the present disclosure are combined or operated as one body, the present disclosure is not necessarily limited to such embodiment. That is, as long as it is within the scope of the present disclosure, one or more of those components may be selectively combined and operated.

Although operations are illustrated in a specific order in the drawings, it should not be understood as requiring that the operations be performed in the specific order or sequential order illustrated, or that all the illustrated operations be performed to obtain a desired result. In certain circumstances, multitasking and parallel processing may be advantageous. Moreover, separation of the various components in the embodiments described above should not be construed as necessarily requiring such separation, and it should be understood that the program components and systems described herein may generally be integrated together into a single software product or packaged into multiple software products.

The present disclosure has been mainly described above with respect to the embodiments thereof. Those of ordinary skill in the art to which the present disclosure pertains will understand that the present disclosure can be implemented in a modified form without departing from the essential characteristics of the present disclosure. Therefore, the disclosed embodiments should be considered in an illustrative rather than a restrictive sense. The scope of the present disclosure should be construed by the claims rather than the foregoing description, and all differences within the scope equivalent thereto should be construed to be included in the present disclosure.

MODE FOR EMBODYING INVENTION

The mode for embodying the invention has been described above in the best mode for embodying the invention.

INDUSTRIAL APPLICABILITY

The present disclosure relates to a module and method for linking driving units, and more specifically, the present disclosure is applicable for various purposes during robot driving by a master controlling a plurality of driving units included in a plurality of slave devices through communication in the robot system, and accordingly has industrial applicability.

What is claimed is:

1. A module for linking driving units of a robot system, comprising:
   a communication unit that provides communication between a master and a plurality of slave devices, one of the plurality of slave devices including a plurality of driving units;
   a control unit that controls the plurality of driving units connected to the one of the plurality of slave devices in response to a request of the master;
   a device information unit that manages a driving unit control table including a driving unit identifier for each of the plurality of driving units connected to the one of the plurality of slave devices; and
   the plurality of driving units, each of the plurality of driving units configured to drive a motor according to the driving unit control table,
   wherein, for the device information unit, the driving unit identifier is set non-redundantly so as to be used as a key value, and
   wherein, for the device information unit, one of the plurality of slave devices, which includes the plurality of driving units, is managed by linking shared information among the plurality of driving units by using a mate identifier.

2. The module according to claim 1, wherein the mate identifier includes driving unit identifiers of all other driving units included in the slave device except oneself.

3. The module according to claim 1, wherein another of the plurality of slave devices includes a single driving unit.

4. A method for linking driving units of a robot system including a master and a plurality of slave devices, the method comprising:
   receiving, by one of the plurality of slave devices including a plurality of driving units, a request to change information of a driving unit among the plurality of driving units from a master;
   changing information of the driving unit in a control table of the driving unit based on the request;
   obtaining an identifier of other driving unit from a mate identifier included in the control table of the driving unit;
   accessing the control table of the other driving unit by using the identifier of other driving unit, and changing information of the other driving unit; and controlling the driving unit to operate a motor based on the changed information of the driving unit, wherein the mate identifier includes driving unit identifiers of all other driving units included in the slave device except oneself, and wherein the identifier of the other driving unit is set non-redundantly.

5. The method according to claim 4, wherein the information of the driving unit is shared information of the one of the plurality of slave devices.

6. A non-transitory computer-readable recording medium storing a computer program for executing the method according to claim 4.

\* \* \* \* \*